United States Patent [19]
Kim et al.

[11] Patent Number: 5,773,945
[45] Date of Patent: Jun. 30, 1998

[54] TIME-COMPENSATED OVERCURRENT DETECTION CIRCUIT FOR DC MOTOR

[75] Inventors: Yong-Ho Kim, Seoul; Hyun-Min Jo, Bucheon, both of Rep. of Korea

[73] Assignee: Samsung Electronics, Co. Ltd., Suwon, Rep. of Korea

[21] Appl. No.: 677,346

[22] Filed: Jul. 2, 1996

[30] Foreign Application Priority Data

Jul. 3, 1995 [KR] Rep. of Korea .................. 1995-19295

[51] Int. Cl.$^6$ ...................................... H02H 7/08
[52] U.S. Cl. .......................... 318/434; 388/902; 388/903; 361/31; 361/87; 361/94
[58] Field of Search ................................. 361/28, 30–34, 361/86–87, 88–90; 318/434; 388/800–823, 902, 903, 916

[56] References Cited

U.S. PATENT DOCUMENTS 3,584,282  6/1971  Reeves ..................................... 388/811
4,473,856  9/1984  Takahashi et al. ......................... 361/31
4,532,567  7/1985  Kade ......................................... 361/31
5,159,516  10/1992  Fujihira ..................................... 361/18

*Primary Examiner*—David S. Martin
*Attorney, Agent, or Firm*—Marger, Johnson, McCollom, & Stolowitz P.C.

[57] ABSTRACT

A time-compensated overcurrent detection circuit shuts off a D.C. motor during large overcurrent conditions caused by actual constraints on the motor. The circuit prevents premature motor shut off by establishing a minimum activation time for shutting off the D.C. motor. An overcurrent time compensator establishes a minimum time period for activating a motor reset signal after sensing an overcurrent condition. The circuitry uses a relatively small capacitor that provides quick response to overcurrent conditions.

15 Claims, 7 Drawing Sheets

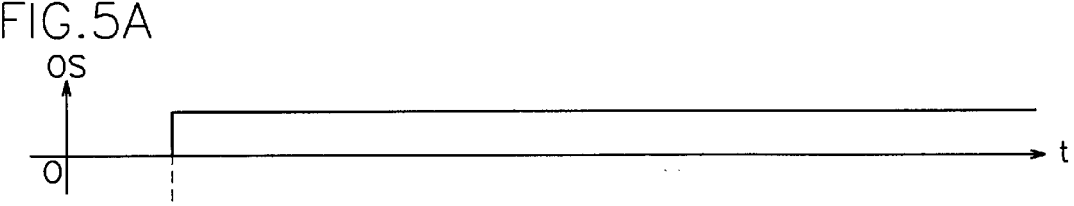
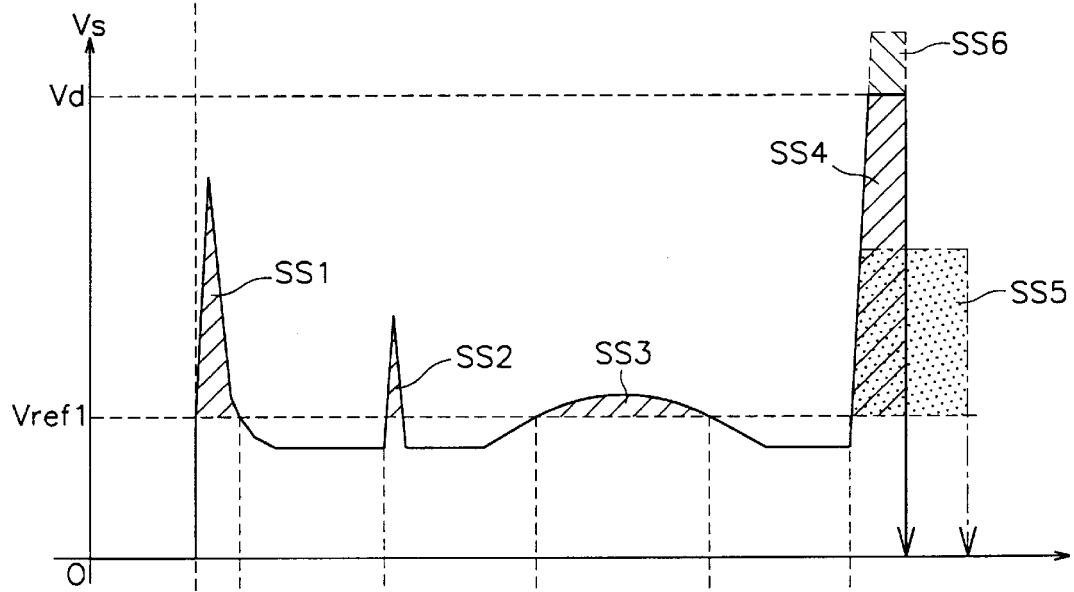
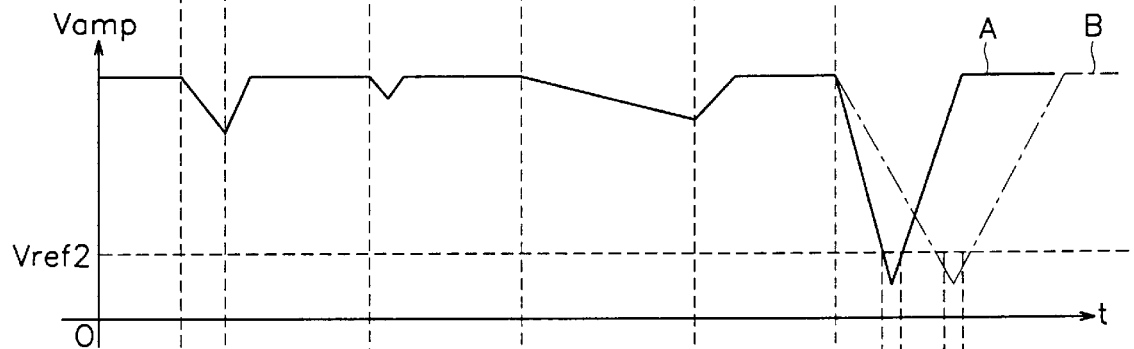
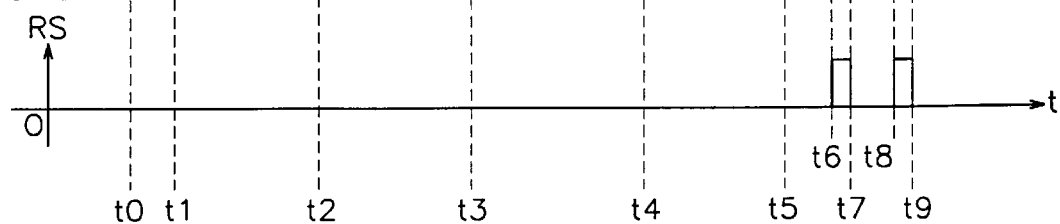

5,773,945

TIME-COMPENSATED OVERCURRENT DETECTION CIRCUIT FOR DC MOTOR

BACKGROUND OF THE INVENTION

1. Field of the Invention

The present invention relates to a time-compensated overcurrent detection circuit for a DC motor. The DC motor is automatically shut off during potentially damaging large overcurrent conditions when the motor is constrained. A time-compensator circuit prevents premature motor shut-off during temporary overcurrent conditions that would not damage the motor. The invention shuts off the motor quickly during larger overcurrent conditions while increasing the shut-off time for less severe overcurrent conditions. However, compensating circuitry establishes a minimum activation time that prevents premature motor shut-off during brief non-damaging overcurrent conditions.

2. Description of the Prior Art

FIG. 3 is a diagram of a current waveform for a conventional DC motor.

Generally, the drive current for a motor varies at different stages of operation as illustrated in FIG. 3. When the motor is first turned on, the drive current increases for a period A and then returns to a normal operation state shown in period B. When the motor is constrained, the drive current increases as shown in period C. If the motor continues to be constrained and power continues to be supplied, the increased current will eventually damage the motor.

The DC motor is operated using a mechanical relay or a semiconductor power switch. In order to prevent the DC motor from being damaged due to a mechanical constraint, an overcurrent protection circuit turns off the relay or switch cutting off power to the motor. The overcurrent protection circuit should not shut off power to the motor during the start-up stage shown in period A while the motor begins rotating.

To prevent premature motor shut off, the overcurrent is not detected for a preselected time period of, for example, 0.2 to 0.4 seconds after initial motor start up. This conventional method requires complex circuitry and does not provide overcurrent protection during transitional period A when many potentially damaging overcurrent conditions can occur.

One conventional method for solving the initial overcurrent condition includes using a low-pass filter (LPF). However, this method requires a large capacitor. The large capacitor in the LPF slows response time for the overcurrent protection circuit if the motor is actually constricted during subsequent operation.

Premature shut off also continues to occur for drive currents which rise only slightly above a reference current value, for example, when motor lubricating oil in the mechanical device is too low or the operating temperature is low.

FIG. 1 is a circuit diagram illustrating a conventional overcurrent detection circuit for a DC motor solving the above-mentioned disadvantages.

FIGS. 2A to 2D are diagrams of waveforms at different nodes in FIG. 1. The waveform in FIG. 2A shows a starting signal. The waveform in FIG. 2B shows a motor voltage and a first reference voltage. The waveform in FIG. 2C shows an integrated voltage and a second reference voltage and the waveform in FIG. 2D shows a motor reset signal.

Referring to FIG. 1, the conventional overcurrent detection circuit for a DC motor includes a micro-controller 10 for receiving signals from a signal input terminal I for driving a motor and a reset terminal R for receiving a reset signal. The controller produces a signal for controlling the motor through a signal output terminal O. A motor driver 20 operates according to the signal output from the micro-controller 10 and generates a signal that drives the motor.

A motor M is connected to an output terminal of the motor driver 20 and is driven according to a current signal $I_M$ from the motor driver 20. A converter 30 converts a current signal flowing in the motor M into a corresponding voltage signal $V_s$. An integrator 40 compares a signal output from the converter 30 with a reference voltage Vref1 for detecting overcurrent and integrating the detected value.

An overcurrent detector 50 compares the integrated signal output from the integrator 40 with a second reference voltage Vref2. Overcurrent detector 50 generates a reset signal RS corresponding to an overcurrent condition when the signal generated from the integrator 40 is less than the reference voltage Vref2.

The motor driver 20 includes a transistor Q2 having a base terminal coupled to an output terminal O of the micro-controller 10, a grounded emitter terminal, and a collector terminal coupled to a terminal on relay RY. The relay RY includes an electromagnet EM2 coupled between a power supply $V_{DC}$ and the collector terminal of the transistor Q2, and a switch S2 coupled between the electromagnet EM2 and the motor M. The converter 30 includes a resistor Rs coupled between the motor M and ground.

The integrator 40 includes an input resistor Rin with one terminal connected to the converter 30; a first operational amplifier OP4 with an inverting input terminal connected to the input resistor Rin and a non-inverting input terminal connected to a first reference voltage Vref1. A capacitor Cin is connected between the input resistor Rin and an output terminal of the first operational amplifier OP4.

The overcurrent detector 50 includes a second operational amplifier OP5 with an inverting input terminal coupled to the output terminal of the first operational amplifier OP4 and a non-inverting input terminal connected to reference voltage Vref2.

The operation of the conventional overcurrent detection circuit for a DC motor is explained as follows.

When a driving signal OS shown in FIG. 2A is driven high at input terminal I in the micro-controller 10, the micro-controller 10 turns ON the transistor Q2. Accordingly, the relay RY is turned ON, the switch S2 is closed and the motor driving power $V_{DC}$ drives the motor M.

Motor current $I_M$ flows when the motor M is driven and the motor voltage Vs is established across resistor Rs in the converter 30 as illustrated in FIG. 2B. The integrator 40 receives the motor voltage Vs across the input resistor Rin at the inverting input terminal. Since the value of the input resistor Rin is much greater than that of the resistor Rs, Rin does not influence the signal value of the motor voltage Vs.

The first operational amplifier OP4 in the signal integrator 40 compares the voltage Vs with the first reference voltage Vref1, integrates the value and outputs an integrated voltage Vamp as illustrated in FIG. 2C.

The second operational amplifier OP5 in the overcurrent detector 50 receives the integrated voltage Vamp output from the integrator 40 and compares the integrated voltage Vamp with the second reference voltage Vref2. Overcurrent detetector 50 generates a reset signal RS for the micro-controller 10 as illustrated in FIG. 2D when the integrated voltage Vamp is less than the second reference voltage Vref2.

The micro-controller 10 receives the reset signal RS through the reset terminal R and outputs a signal for turning OFF the motor M when the reset signal is output from the second operational amplifier OP5 of the overcurrent detector 50.

Referring to FIG. 2B, when OS is driven high, initial operation of the motor M causes temporary overcurrent condition SS1. At this time, the sensed motor voltage Vs is greater than the first reference voltage Vref1. Because the overcurrent condition is only temporary, the motor M should not be stopped.

Referring to FIG. 2C, the integrated voltage Vamp, which is the integrated value of the motor voltage Vs, is compared with the second reference voltage Vref2. The overcurrent SS1 caused by the initial motor start-up is not enough to damage the motor M. Accordingly, the second voltage reference Vref2 is selected so that the integrated value of Vs during the initial motor start-up is greater than Vref2. Thus, the reset signal RS is not driven high and the micro-controller 10 does not stop the motor M.

A temporary constraint while the motor M is being driven may cause a temporary overcurrent condition SS2. The overcurrent condition SS2 is not severe enough to stop motor M. While the voltage Vs is greater than the first reference voltage Vref1 during SS2, the second reference voltage Vref2 is less than the integrated voltage Vamp. Thus, the reset signal RS is not activated by the operational amplifier OP5.

Overcurrent condition SS3 results from friction between a mechanical device and the motor M. The overcurrent condition SS3 is also not severe enough to damage motor M. Accordingly, the integrated voltage Vamp is greater than the second reference voltage Vref2 and the reset signal RS is not activated.

When the motor M is broken or restrained while operating, an overcurrent condition SS4 is created that requires power shut-down. The motor voltage Vs during SS4 is greater than the first reference voltage Vref1 and the value of the integrated voltage Vamp is less than the second reference voltage Vref2. The operational amplifier 50 activates the reset signal RS. The micro-controller 10 receives the reset signal RS and outputs a signal that stops the motor M.

Thus, the temporary overcurrent SS1 during initial motor start-up, the temporary overcurrent SS2 during motor operation and the small overcurrent SS3 caused by the increase of mechanical friction are all distinguished and processed separately from the overcurrent SS4 caused by actual mechanical constraint on the motor M.

The above-mentioned conventional method has a disadvantage in that the response time for shutting-off the motor becomes shorter for larger overcurrent conditions. If the overcurrent protection circuit activates too quickly, motor M may be shut off prematurely, for example, during a temporary power surge.

SUMMARY OF THE INVENTION

The present invention is a time-compensated overcurrent detection circuit that shuts off a D.C. motor during large overcurrent conditions caused by actual constraint of the motor at rapid speed. The circuit prevents premature motor shut off by establishing a minimum activation time for generating the circuit reset signal. The compensation circuit uses a relatively small capacitor that allows quick response to severe overcurrent conditions.

The time-compensating overcurrent detection circuit comprises a converter that converts a current signal flowing in the a motor into a corresponding voltage signal. An integrator compares the voltage signal from the converter with a first reference voltage, detects the overcurrent condition and integrates overcurrent signals greater than the reference voltage. An overcurrent detector compares a signal from the integrator with the reference voltage, determines when the signal from the integrator is less than a second reference voltage and outputs a corresponding reset signal.

The overcurrent time compensator establishes a minimum time period for activating the motor reset signal after sensing an overcurrent condition. The compensator establishes the minimum time period by reducing the integrated output signal from the integrator when the converter output signal is above a predetermined value.

Additional objects and advantages of the invention will be set forth in part in the description which follows, and will be clear from the description. The objects and advantages of the invention will be realized and attained by means of the elements and combinations particularly pointed out in the appended claims.

BRIEF DESCRIPTION OF THE DRAWINGS

The accompanying drawings illustrate embodiments of the invention and, together with the description, serve to explain the principles of the invention. In the drawings:

FIGS. 5A to 5D are diagrams of waveforms at different nodes in FIG. 4.

DESCRIPTION OF THE PREFERRED EMBODIMENTS

Reference will now be made in detail to the preferred embodiments of the present invention, as examples of which are illustrated in the accompanying drawings. Wherever possible, the same reference numbers will be used throughout the drawings to refer to the same or like parts.

Figure 1:
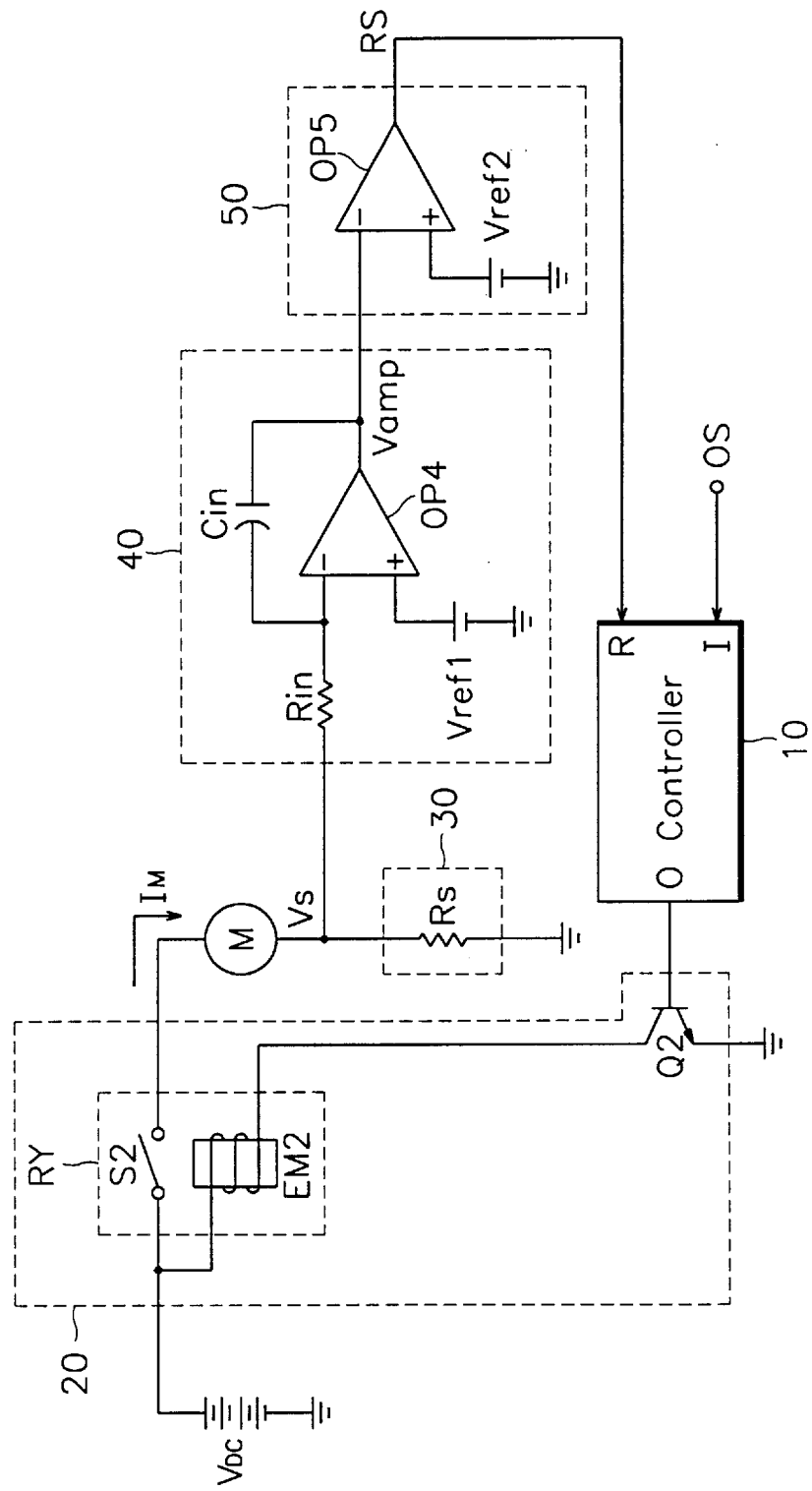
FIG. 1 is a circuit diagram illustrating a conventional overcurrent detection circuit for a DC motor.
Figure 2A:
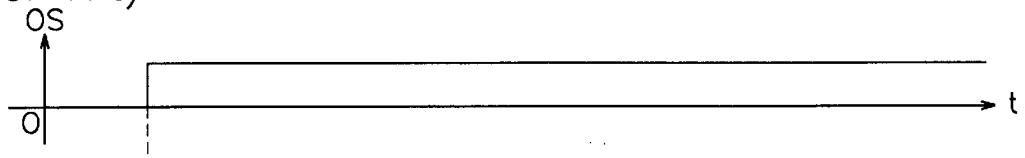
FIGS. 2A to 2D are diagrams of waveforms at different nodes in FIG. 1.
Figure 2B:
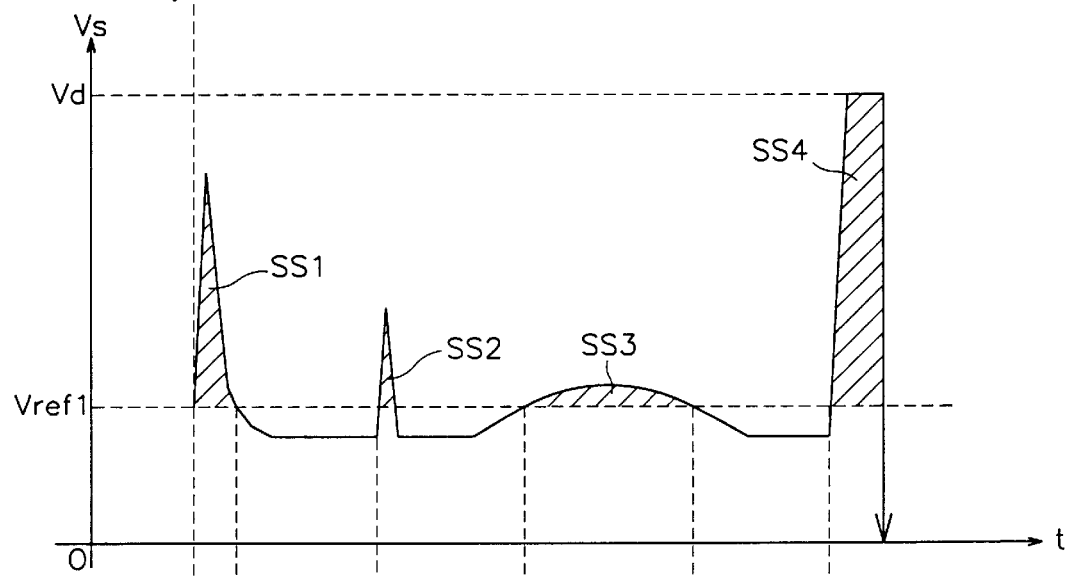
Figure 2C:
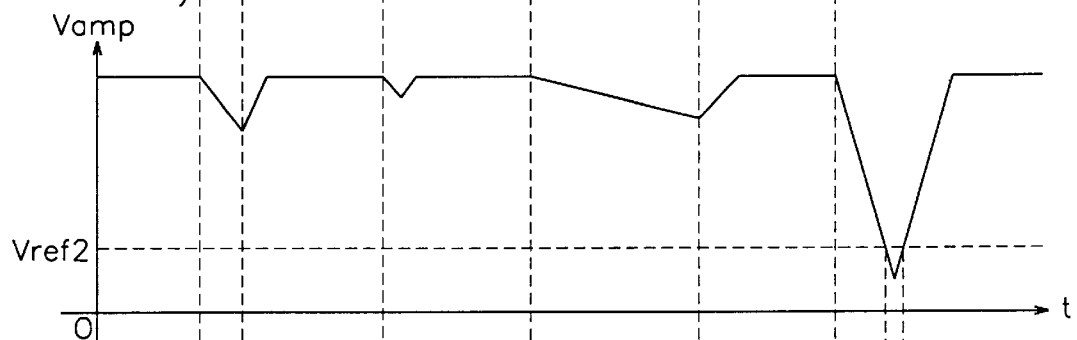
Figure 2D:
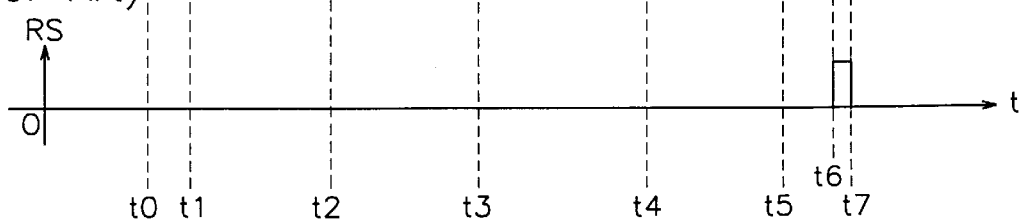
Figure 3:
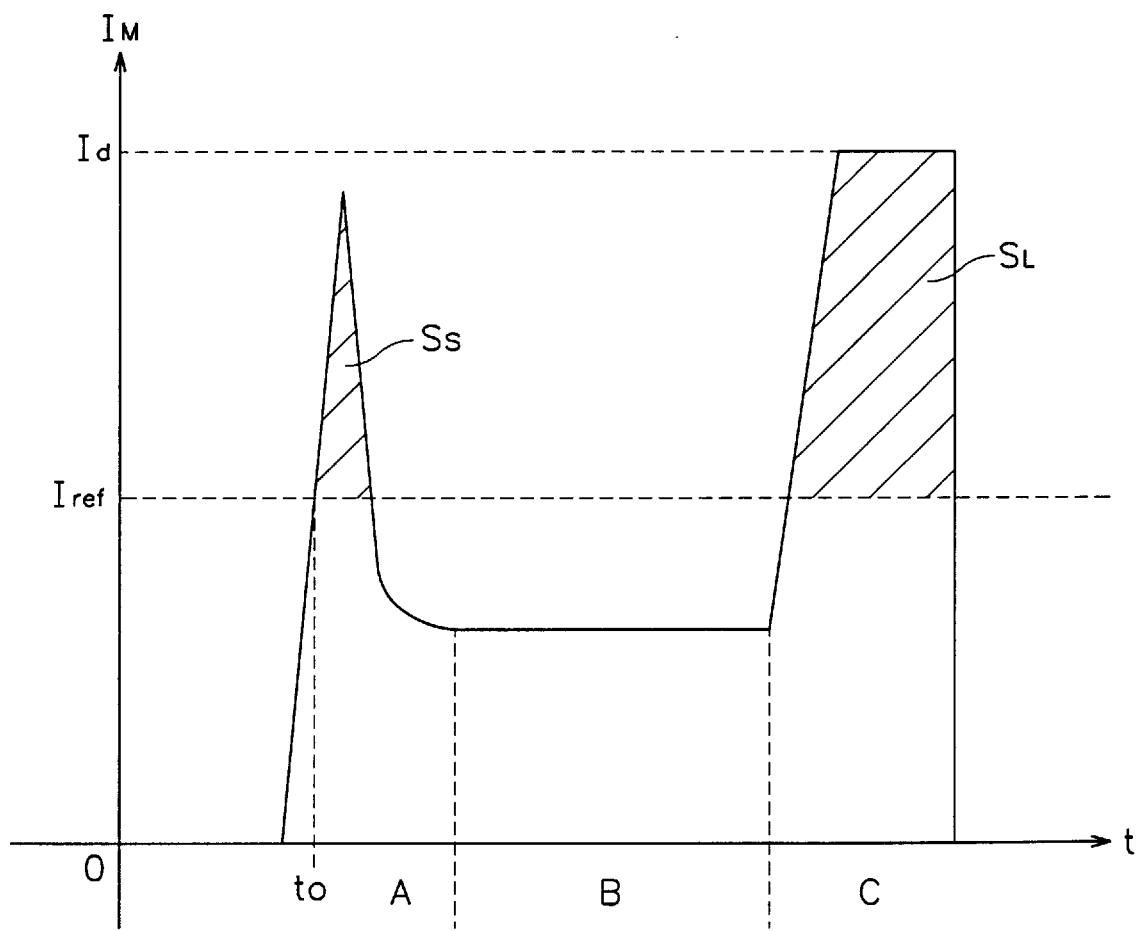
FIG. 3 is a diagram of a current waveform for a conventional DC motor.
Figure 4:
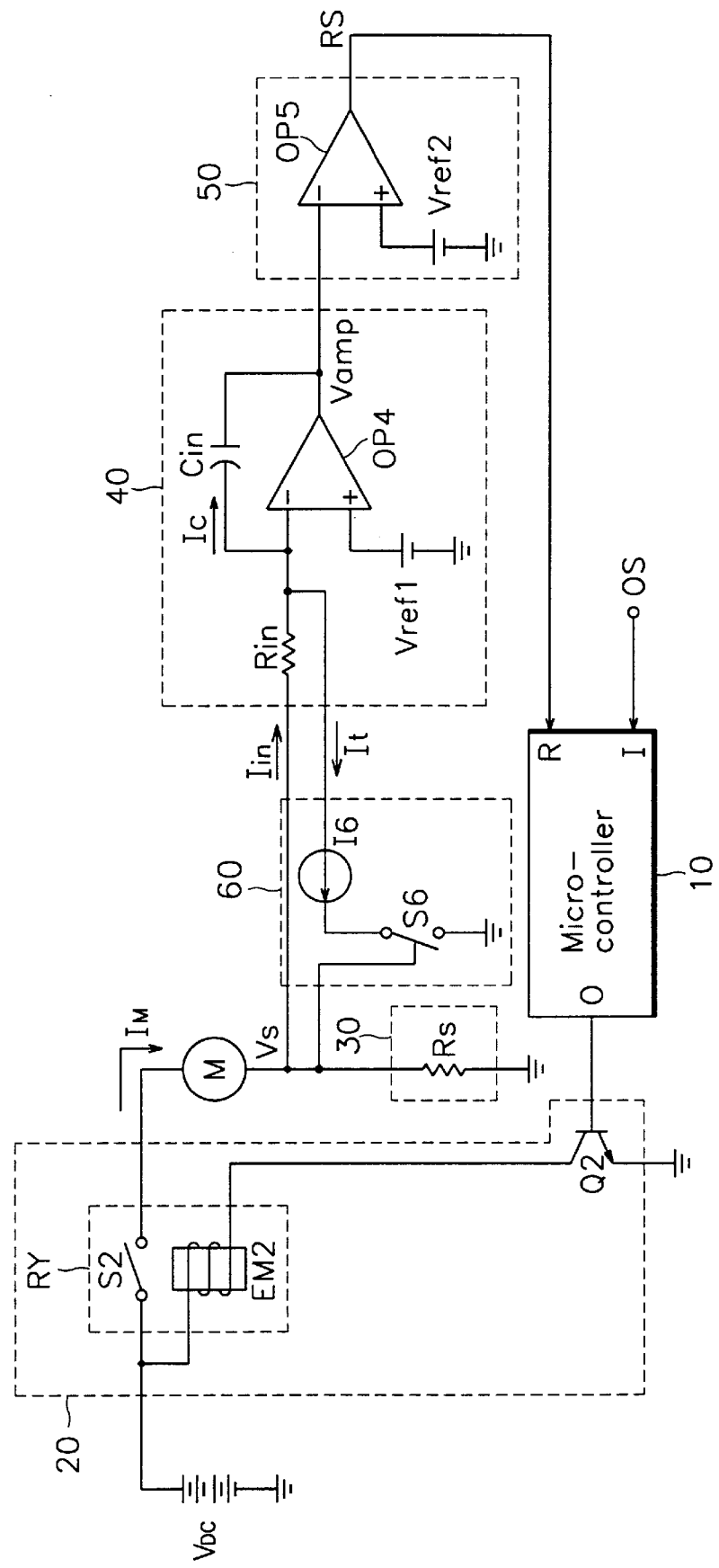
FIG. 4 is a circuit diagram illustrating a time-compensating overcurrent detection circuit for a DC motor according to a first preferred embodiment of the present invention.

Referring to FIG. 4, a time-compensating overcurrent detection circuit for a DC motor according to a first preferred embodiment of the present invention comprises a micro-controller 10, a motor driver 20, a motor M, a converter 30, an integrator 40, and an overcurrent detector 50 all similar to those previously described in FIG. 1. The motor driver 20 includes a transistor Q2, a relay RY having an electromagnet EM2 and a switch S2 similar to that described above in FIG. 1.

Of particular interest is an overcurrent time compensator 60 that establishes a minimum activation time for shutting off the motor M after detecting an overcurrent condition. The overcurrent time compensator 60 decreases the integrated overcurrent value output from the integrator 40 when the current Iin from the converter 30 is greater than a predetermined amount.

The overcurrent time compensator 60 includes a current source I6 with an input terminal connected to input resistor Rin, and a switch S6 having a first terminal connected to an output terminal of the current source I6 and a second terminal coupled to ground. The switch S6 is controlled by the current from motor M.

The operation of the time-compensating overcurrent detection circuit for a DC motor according to the first preferred embodiment of the present invention will be explained with reference to the accompanying drawings hereinafter.

When a driving signal OS as illustrated in FIG. 5A is activated at input terminal I in the micro-controller 10, the micro-controller 10 outputs a signal to the motor driver 20 turning ON the transistor Q2. Accordingly, the relay RY is turned ON, the switch S2 is closed, the motor driving power $V_{DC}$ is supplied to the motor M, and the motor M is driven.

Motor current $I_M$ flows from motor M through resistor Rs in the converter 30. Converter 30 generates a motor voltage Vs as illustrated in FIG. 5B. The integrator 40 receives the motor voltage Vs through the input resistor Rin into the inverting input terminal. Since the value of the input resistor Rin is much greater than the value of the resistor Rs, it does not influence the Vs signal value generated by resistor Rs.

The first operational amplifier OP4 in the signal integrator 40 compares the signal at the inverting terminal with the first reference voltage Vref1. The result is integrated and output as Vamp as illustrated in FIG. 5C.

The overcurrent detector 50 receives the integrated voltage Vamp output from the integrator 40 through the inverting input terminal, compares the integrated voltage Vamp with the second reference voltage Vref2, and outputs a reset signal RS the micro-controller 10. The reset signal RS, as illustrated in FIG. 5D, is driven high when the integrated voltage Vamp is less than the second reference voltage Vref2.

The micro-controller 10 receives the reset signal RS through the reset terminal R and outputs a signal that turns OFF the motor M when the reset signal RS activated by the overcurrent detector 50.

Referring to FIG. 5B, when signal OS is initially applied, the initial operation of the motor M results in the temporary overcurrent SS1. If the motor voltage Vs is compared with the first reference voltage Vref1, the sensed motor voltage Vs is greater than the first reference voltage Vref1. However, the motor should not be stopped by the overcurrent condition.

Accordingly, referring to FIG. 5C, the integrated voltage Vamp which is the integrated value of the modified motor voltage Vs1 is compared with the second reference voltage Vref2. The micro-controller 10 does not shut off motor M since the extent of the overcurrent condition is not large enough to damage the motor M.

A temporary constraint on the motor M can cause the overcurrent condition SS2. However, due to the short period of SS2 the motor should not be stopped. Accordingly, the reset signal RS is not activated since the second reference voltage Vref2 is less than the integrated voltage Vamp.

Overcurrent condition SS3 results from friction between a mechanical device and the motor M. Since the overcurrent condition SS3 would not damage motor M, the motor M should also not be stopped. Accordingly, the reset signal RS is not driven high since the second reference voltage Vref2 is less than the integrated voltage Vamp.

When the motor M is connected to the mechanical device and is finished, broken or restrained for a significant amount of time, overcurrent conditions SS4, SS5 and SS6 occur. During SS4, SS5 or SS6, the motor voltage Vs is greater than the first reference voltage Vref1 and the value of the integrated voltage Vamp is less than that of the second reference voltage Vref2. In turn, the operational amplifier 50 outputs the reset signal RS. The micro-controller 10 receives the reset signal RS and outputs a signal that stops the motor M.

When the size of the motor voltage Vs is twice as large as the first reference voltage Vref1, as shown in Equation 1, the input resistor Rin receives the voltage input signal shown in SS5. The input current Iin integrator 40 becomes that shown in Equation 2 which charges the capacitor Cin with the current Ic.

$$Vs = 2 \times Vref1 \qquad (1)$$

$$Iin = \frac{2Vref1 - Vref1}{Rin} \qquad (2)$$

Since the DC motor M is restricted, the overcurrent protection circuit is activated after a predetermined time period (t=t5 to t8).

When the constraint current Iin in the DC motor M is twice as much as that in the above-mentioned case, the voltage Vs is shown in Equation 3. The size of the input current Iin for overcurrent condition SS4 becomes that as shown in Equation 4. The capacitor Cin then starts charging and the size of the capacitor current Ic becomes three times the value in the above-mentioned case.

$$Vs = 2 \times (2 \times Vref1) \qquad (3)$$

$$Iin = \frac{4Vref1 - Vref1}{Rin} \qquad (4)$$

In turn, (t5 to t6) the overcurrent protection circuit shuts off the motor M faster at one third of the time period for overcurrent condition SS5 (i.e., from t5–t8 to t5–t6). If the constraint current Iin triples, the actuation time for shutting off the motor M is reduced to one fifth of the original time period for overcurrent condition SS5. Thus, the time period in which the overcurrent protection circuit shuts off motor M continues to get smaller as the size of the constraint current gets larger.

If the size of the constraint current becomes extremely large, the time period becomes too short. In this situation, the overcurrent time compensator 60 is actuated establishing a minimum actuation time period. When the size of the constraint current is more than a predetermined value, the motor voltage Vs rises and the switch S6 in the overcurrent time compensator 60 is turned ON.

Accordingly, the compensation current It flows and the capacitor current Ic becomes that shown in Equation 5. The time period for shutting off the DC motor M is then prevented from getting any shorter.

$$Ic = Iin - It \qquad (5)$$

For example, when the size of the constraint current Iin is triple, that is, the size of the motor voltage Vs is six times as much as the first reference voltage, the size of the constraint current Iin is calculated as shown in following Equation 6. Provided that the size of the compensation current It at that time is equal to that shown in following Equation 7, the capacitor current Ic becomes that shown in Equation 8.

$$Iin = \frac{6Vref1 - Vref1}{Rin} \quad (6)$$

$$It = \frac{2Vref1}{Rin} \quad (7)$$

$$Ic = Iin - It = \frac{3Vref1}{Rin} \quad (8)$$

As described above, the overcurrent protection circuit distinguishes the temporary overcurrent condition SS1 from initial start up, the temporary overcurrent SS2 caused during motor operation and the small overcurrent SS3 caused by an increase in mechanical friction from the overcurrent conditions SS4, SS5 and SS6 which actually constrain the motor. In addition, a minimum time period is established for shutting off the motor M after detecting a constrained motor M.

Hereinafter, a second preferred embodiment of the present invention will be described with reference to the accompanying drawings.

Figure 6:
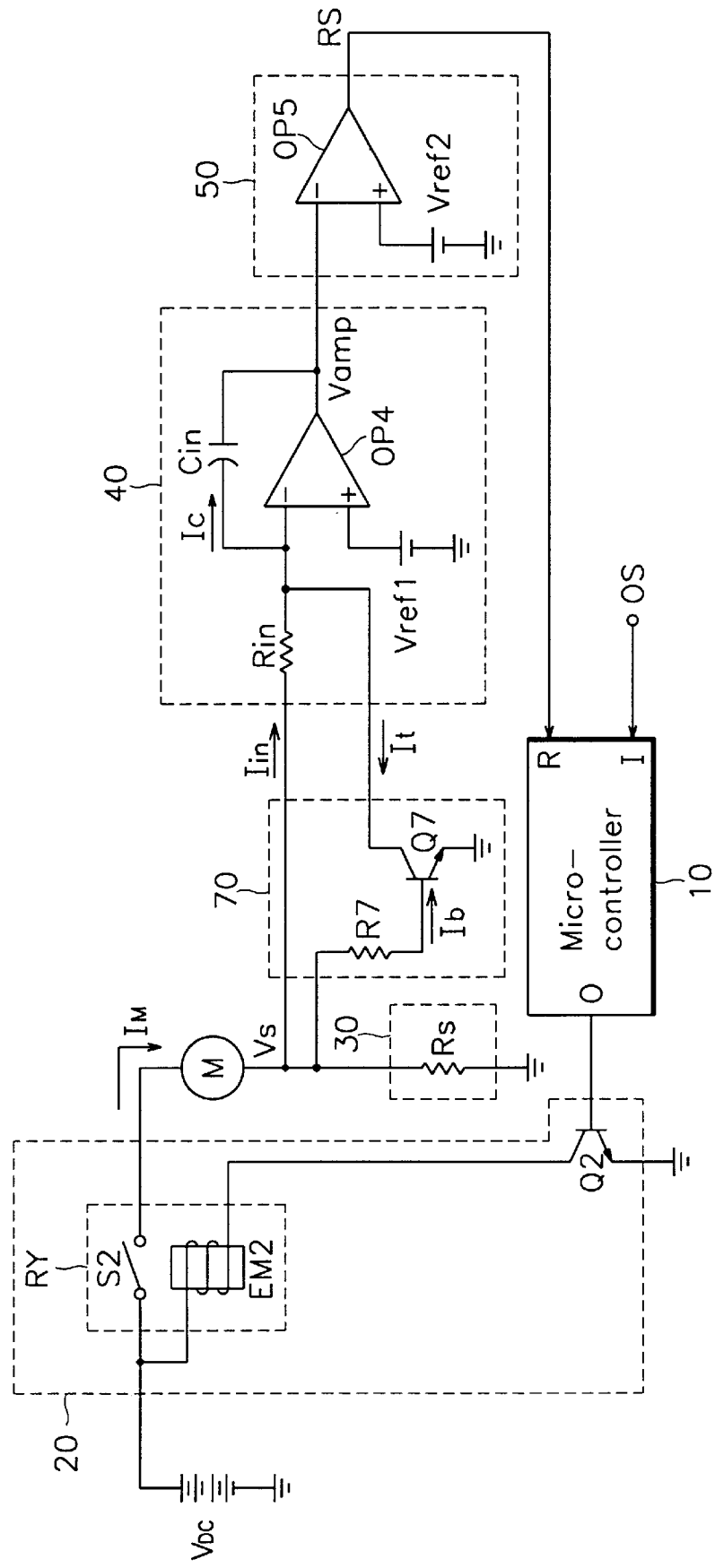
FIG. 6 is a circuit diagram illustrating a time-compensating overcurrent detection circuit for a DC motor according to a second preferred embodiment of the present invention.

Referring to FIG. 6, the second preferred embodiment of the present invention comprises a micro-controller 10, a motor driver 20, a motor M, a converter 30, an integrator 40, an overcurrent detector 50 all similar to those previously described in FIG. 1. The motor driver 20 includes a transistor Q2 and a relay RY having an electromagnet EM2 and a switch S2 similar to that perviously described.

An overcurrent time compensator circuit 70 includes a resistor R7 with one terminal connected to the motor M and a second terminal connected to a base terminal to a transistor Q7. The transistor Q7 includes a collector terminal connected to the input resistor Rin of the integrator 40, and an emitter terminal coupled to ground.

The operation of the time-compensating overcurrent detection circuit according to the second preferred embodiment of the present invention will be explained with reference to the accompanying drawings hereinafter. The overcurrent protection circuitry operates similarly to the overcurrent circuitry shown in FIG. 4. Therefore, explanation of is not described in detail.

During overcurrent conditions SS4, SS5 or SS6, the reset signal RS is generated. The micro-controller 10 receives the reset signal RS and outputs a signal for stopping the motor M.

Equation 1 shows the constraint current Iin when the size of the motor voltage Vs is twice as much as the first reference voltage Vref1. The size of constraint current Iin for overcurrent condition SS5 input to input resistor Rin of the integrator 40 is shown in Equation 2. Thus, the capacitor Cin is charged with the current Ic. An overcurrent protection circuit shuts off the motor after a predetermined time (t=t5 to t8).

For the overcurrent condition SS4, the constraint current Iin generated by the DC motor M is twice as much as described above and the voltage Vs is equal to that shown in Equation 3. The size of the input current Iin input into the input resistor Rin of the integrator 40 becomes that shown in Equation 4. Thus, the capacitor Cin is charged with a current Ic three times the value for overcurrent condition SS5.

The time period which the overcurrent protection circuit shuts off the motor M is reduced by one third to (t5 to t6). In addition, when the size of the constraint current Iin triples, the motor shut off time for the overcurrent protection circuit is reduced to one fifth.

When the size of the constraint current is more than a predetermined value, the motor voltage Vs corresponding to the constraint current rises. The motor voltage Vs is, in turn, applied to the base terminal of the transistor Q7. If the motor voltage Vs is greater than a voltage Vbe between the base terminal and the emitter terminal of the transistor Q7, base current Ib has the value shown in Equation 9, the transistor Q7 is turned ON and the compensation current It flows. The values of the base current Ib and the compensation current It are expressed as shown in Equation 10.

$$Ib=(Vs-Vbe)/R7 \quad (9)$$

$$It=\beta \times Ib \quad (10)$$

where, β is a current amplification factor.

Accordingly, the capacitor current Ic becomes that shown in Equation 11. The size of the compensation current It varies according to the size of the constraint current Iin establishing a minimum time period for shutting off DC motor M.

$$Ic=Iin-It=Iin-\beta \times (Vs-Vbe)/R7 \quad (5)$$

Hereinafter, a third preferred embodiment of the present invention will be described with reference to the accompanying drawings.

Figure 7:
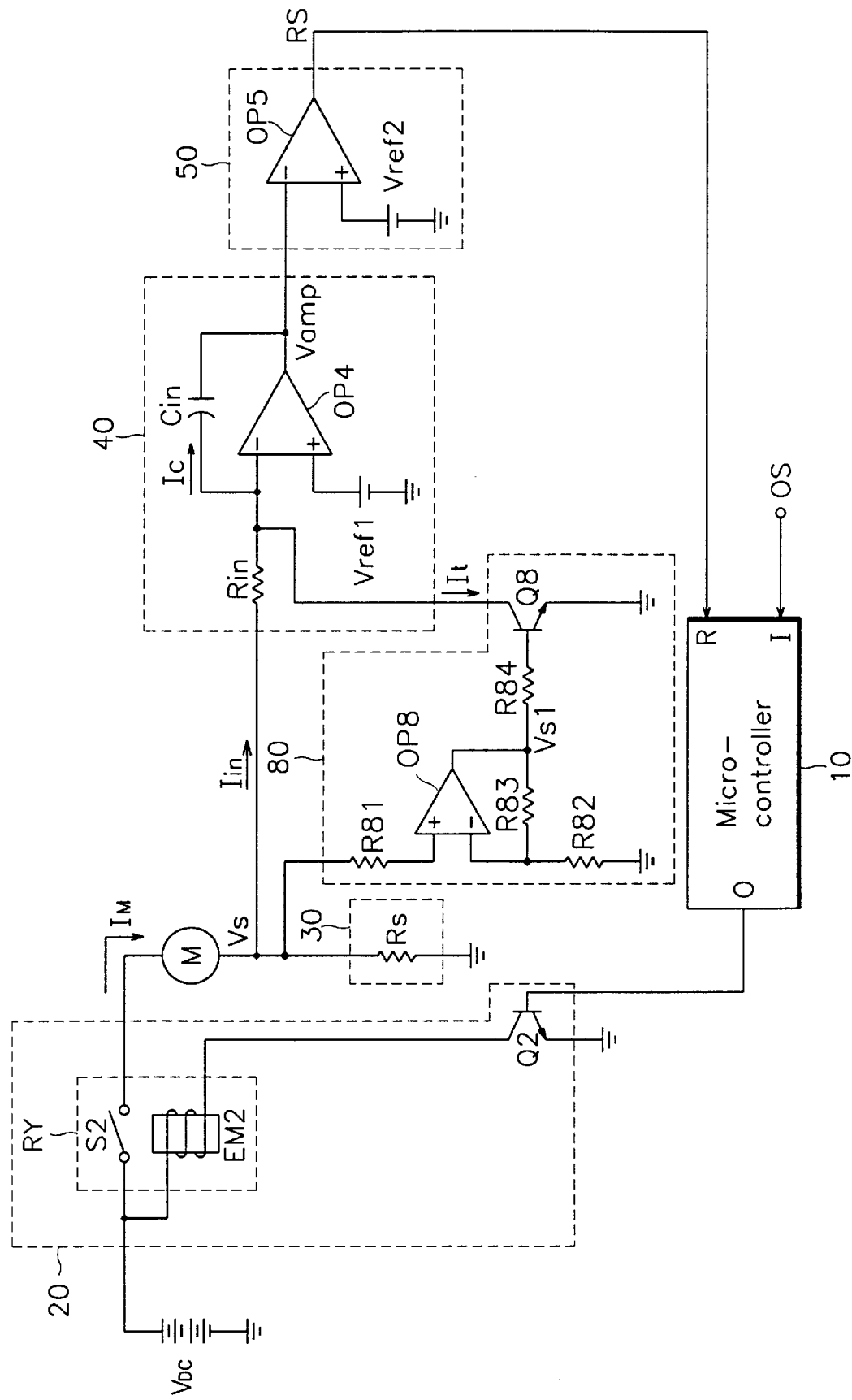
FIG. 7 is a circuit diagram illustrating a time-compensating overcurrent detection circuit for a DC motor according to a third preferred embodiment of the present invention.

FIG. 7 is a circuit diagram illustrating a time-compensating overcurrent detection circuit according to a third preferred embodiment of the present invention.

Referring to FIG. 7, a time-compensating overcurrent detection circuit for a DC motor according to the third embodiment of the present invention comprises a micro-controller 10, a motor driver 20, a motor M, a converter 30, an integrator 40, an overcurrent detector 50 all similar to those previously described in FIG. 1. The motor driver 20 includes a transistor Q2 and a relay RY having an electromagnet EM2 and a switch S2 similar to that perviously described.

An overcurrent time compensator 80 includes a first resistor R81 having one terminal connected to the motor M and an operational amplifier OP8 with a non-inverting input terminal connected to a second terminal of the first resistor R81. A second resistor R82 is connected between an inverting input terminal of the operational amplifier OP8 and ground. A third resistor R83 is connected between the second resistor R82 and an output terminal for operational amplifier OP8. A resistor R84 is coupled between the output terminal of operation amplifier OP8 and a base terminal of a transistor Q8. The transistor Q8 includes a collector terminal connected to the input resistor Rin of the integrator 40 and a grounded emitter terminal coupled to ground.

The operation of the time-compensating overcurrent detection circuit for a DC motor according to the third preferred embodiment of the present invention will be explained with reference to the accompanying drawings hereinafter.

The voltage Vs may be small when the value of resistor Rs is reduced to consume power. When the motor voltage Vs is very small, transistor Q8 of the overcurrent time compensator 80 does not operate well.

The overcurrent signal Vs is detected by the first resistor R81 of the overcurrent time compensator 80. The overcurrent signal is amplified by the third operational amplifier OP8 using the second and the third resistors R82 and R83 as shown in Equation 12. The amplified signal is input to the base terminal of the transistor Q8 through the resistor R84 turning ON the transistor Q8.

$$Vs1 == Vs \times (R83/R82 + 1) \quad (12)$$

Thus, the signal is detected even though the motor voltage Vs is small compared with the voltage between the base terminal and the emitter terminal of the transistor Q8.

The present invention provides a time-compensated overcurrent detection circuit for a DC motor. The time compensation circuitry prevents premature motor shut down due to noise and temporary overcurrent conditions using a relatively small capacitor for precise response. The detection circuit is capable of distinguishing potentially damaging overcurrent conditions due to actual motor contraints from temporary overcurrent conditions that would not damage the D.C. motor. Accordingly, the detection circuit shuts off the motor during the potentially damaging conditions while allowing the motor to continue to operate during non-threating conditions.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

We claim:

1. A time-compensated overcurrent detection circuit for a DC motor, comprising:

a control circuit coupled to the motor for starting and stopping the motor;

a converter coupled to the motor for generating a voltage signal proportional to a drive current in the motor;

an overcurrent detector having an input coupled to the converter and an output coupled to the control circuit, the overcurrent detector generating a motor reset signal for a motor overcurrent condition; and a compensator circuit coupled to the motor and the overcurrent detector, the compensator circuit establishing a given time period before generating the motor reset signal during the motor overcurrent condition, the compensator establishing the given time period by reducing the voltage signal supplied from the converter to the overcurrent detector when the voltage signal rises above a predetermined value.

2. A circuit according to claim 1 wherein the overcurrent detector comprises the following:

an integrator having a first input coupled to the converter, a second input coupled to a first reference voltage and an output generating an integrated overcurrent signal when the voltage signal is above the reference voltage; and a comparator including a first input coupled to the integrator, a second input coupled to a second voltage reference and an output coupled to the control circuit, the comparator generating the motor reset signal when the integrated overcurrent signal is less than the second reference voltage.

3. A circuit according to claim 2 wherein the converter comprises a converter resistor having a first terminal coupled to the motor and a second terminal coupled to ground.

4. A circuit according to claim 2 wherein the integrator includes:

an integrator resistor having a first terminal coupled to the converter resistor and a second terminal;

an integrator operational amplifier having an inverting input coupled to the second terminal of the integrator resistor, a non-inverting input coupled to the first reference voltage and an output; and a capacitor having a first terminal coupled to the second terminal of the integrator resistor and a second terminal coupled to the output of the intergrator operational amplifier.

5. A circuit according to claim 4 wherein the integrator resistor has a resistance substantially larger than a resistance for the converter resistor.

6. A circuit according to claim 2 wherein the converter establishes an input current for the first input of the integrator and the compensator limits the input current for controlling the minimum time period for generating the reset signal.

7. A circuit according to claim 2 wherein the compensator circuit varies the integrated overcurrent signal according to the converter voltage signal.

8. A circuit according to claim 1 wherein the compensator circuit constantly controls the minimum reset signal time period for any changes in the motor drive current.

9. A time-compensated overcurrent detection circuit for a DC motor, comprising:

a control circuit coupled to the motor for starting and stopping the motor;

a converter coupled to the motor for generating a voltage signal proportional to a drive current in the motor;

an overcurrent detector having an input coupled to the converter and an output coupled to the control circuit, the overcurrent detector generating a motor reset signal for a motor overcurrent condition; and a compensator circuit coupled to the motor and the overcurrent detector, the compensator circuit establishing a minimum time period for generating the motor reset signal during the motor overcurrent condition, the compensator circuit including a current generator having an input coupled to the input of the overcurrent detector and an output and a switch having a first terminal connected to the output of the current generator, a second terminal coupled to ground and a third terminal coupled to the voltage source for controlling activation of the switch.

10. A time-compensated overcurrent detection circuit for a DC motor, comprising:

a control circuit coupled to the motor for starting and stopping the motor;

a converter coupled to the motor for generating a voltage signal proportional to a drive current in the motor;

an overcurrent detector having an input coupled to the converter and an output coupled to the control circuit, the overcurrent detector generating a motor reset signal for a motor overcurrent condition; and a compensator circuit coupled to the motor and the overcurrent detector, the compensator circuit establishing a minimum time period for generating the motor reset signal during the motor overcurrent condition the compensator circuit including a resistor having a first terminal coupled to the voltage signal and a second terminal, and a transistor having a base terminal coupled to the second terminal of the resistor, a collector terminal coupled to the input of the overcurrent detector and an emitter terminal coupled to ground.

11. A time-compensated overcurrent detection circuit for a DC motor, comprising:

a control circuit coupled to the motor for starting and stopping the motor;

a converter coupled to the motor for generating a voltage signal proportional to a drive current in the motor;

an overcurrent detector having an input coupled to the converter and an output coupled to the control circuit, the overcurrent detector generating a motor reset signal for a motor overcurrent condition; and a compensator circuit coupled to the motor and the overcurrent detector, the compensator circuit establishing a given time period before generating the motor reset signal during the motor overcurrent condition, the compensator circuit including a first resistor having a first terminal receiving the voltage signal and a second terminal;

an operational amplifier with a non-inverting input terminal coupled to the second terminal of the first resistor, an inverting input terminal and an output;

a second resistor coupled between the inverting input terminal on the operational amplifier and a ground signal;

a third resistor coupled between the inverting input terminal and the output of the operational amplifier;

a fourth resistor having a first terminal coupled to the output on the operational amplifier and a second terminal; and a transistor having a base terminal connected to the second terminal on the fourth resistor, a collector terminal coupled to the input of the overcurrent detector and an emitter terminal coupled to a ground signal.

12. A time-compensator for an overcurrent detection circuit for a DC motor, comprising:

a converter for generating a control signal proportional to a drive current in the DC motor; and a switch circuit including a first terminal receiving the control signal produced by the drive current in the DC motor for monitoring a voltage level of the control signal; and a second terminal coupled to the overcurrent detection circuit that reduces the voltage level of the control signal supplied from the converter to the overcurrent detector when the voltage level of the control signal rises above a predetermined value thereby establishing a predetermined activation time delay before the overcurrent detection circuit generates a reset signal.

13. A circuit according to claim 12 wherein the switch circuit includes a third terminal operably coupling the second terminal to ground according to the monitored drive current at the first terminal.

14. A method for compensating an overcurrent detection circuit for a DC motor, comprising:

generating a voltage control signal proportional to a DC motor drive current;

processing the voltage control signal to identify an overcurrent condition in the DC motor;

generating a motor reset signal when the DC motor is in the overcurrent condition; and reducing the voltage control signal before being processed for identifying the overcurrent condition when the voltage control signal rises above a predetermined voltage value thereby setting a predetermined time period before generating the motor reset signal during the motor overcurrent condition.

15. A method according to claim 14 where the processing step comprises the following:

comparing the voltage control signal to a first reference voltage;

integrating the voltage control signal when said voltage control signal is greater than the reference voltage;

comparing the integrated voltage control signal to a second reference voltage;

generating the motor reset signal when the integrated control signal is less than the second reference voltage.

* * * * *